United States Patent
Alasti et al.

(10) Patent No.: US 10,624,052 B2
(45) Date of Patent: Apr. 14, 2020

(54) TIMING ADVANCE FOR SATELLITE-BASED COMMUNICATIONS

(71) Applicant: DISH Network L.L.C., Englewood, CO (US)

(72) Inventors: Mehdi Alasti, Reston, VA (US); Siddhartha Chenumolu, Broadlands, VA (US); Amirali Emami, Vienna, VA (US); Mariam Sorond, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/047,355

(22) Filed: Jul. 27, 2018

(65) Prior Publication Data

US 2019/0349877 A1 Nov. 14, 2019

Related U.S. Application Data

(60) Provisional application No. 62/670,349, filed on May 11, 2018.

(51) Int. Cl.
*H04W 56/00* (2009.01)
*H04W 74/08* (2009.01)
(Continued)

(52) U.S. Cl.
CPC .... *H04W 56/0045* (2013.01); *H04B 7/18513* (2013.01); *H04W 4/029* (2018.02); *H04W 74/0833* (2013.01)

(58) Field of Classification Search
CPC ............. H04W 56/0045; H04W 4/029; H04W 74/0833; H04B 7/18512
See application file for complete search history.

(56) References Cited

U.S. PATENT DOCUMENTS 6,107,959 A * 8/2000 Levanon ............... G01S 5/0036
342/357.64
2004/0024791 A1* 2/2004 Martin ............... H04B 7/18563
(Continued)

FOREIGN PATENT DOCUMENTS

EP 3 030 018 A1 6/2016
WO WO-2018031290 A1 * 2/2018 ............ H04W 48/00

OTHER PUBLICATIONS

U.S. Appl. No. 16/151,936, filed Oct. 4, 2018 Non-Final Rejection dated May 31, 2019, all pages.
(Continued)

*Primary Examiner* — Muthuswamy G Manoharan
(74) *Attorney, Agent, or Firm* — Kilpatrick Townsend & Stockton LLP

(57) ABSTRACT

Various arrangements are presented for using an estimated timing advance for user equipment communications. A location of an instance of user equipment may be determined. A first estimated distance between the user equipment and a communication satellite may be determined using the determined location of the user equipment and an estimated satellite location. A second estimated distance between the communication satellite and a communication network gateway may be determined. An estimated timing offset using the calculated first estimated distance and the determined second estimated distance may be determined. An uplink data frame may be transmitted by the user equipment to the satellite such that a timing of transmission of the uplink data frame is based on the calculated estimated timing offset.

17 Claims, 6 Drawing Sheets

(51) Int. Cl.
*H04W 4/029* (2018.01)
*H04B 7/185* (2006.01)

(56) References Cited

U.S. PATENT DOCUMENTS

| | | | |
|---|---|---|---|
| 2005/0095982 A1 | 5/2005 | Blanchard et al. | |
| 2006/0281476 A1* | 12/2006 | Lane | H04B 7/2125 |
| | | | 455/502 |
| 2011/0256865 A1 | 10/2011 | Sayeed et al. | |
| 2018/0006710 A1* | 1/2018 | Buer | H04B 7/18519 |
| 2018/0241464 A1* | 8/2018 | Michaels | H04B 7/0617 |
| 2018/0352527 A1* | 12/2018 | Wang | H04L 5/0053 |
| 2019/0116568 A1* | 4/2019 | Fertonani | H04W 56/00 |

OTHER PUBLICATIONS

International Search Report and Written Opinion for PCT/US2019/026937 dated Jun. 25, 2019, all pages.
International Search Report and Written Opinion for PCT/US2019/026993 dated Jun. 26, 2019, all pages.

\* cited by examiner

TIMING ADVANCE FOR SATELLITE-BASED COMMUNICATIONS

CROSS REFERENCE TO RELATED APPLICATION

This Application claims priority to U.S. Provisional Patent Application No. 62/670,349, entitled "TIMING ADVANCE FOR SATELLITE-BASED COMMUNICATIONS," filed on May 11, 2018, the entirety of which is hereby incorporated by reference for all purposes.

BACKGROUND

Communication between user equipment (UE) and a base station (e.g., an eNodeB, gNodeB) results in an amount of time elapsing between when a signal is transmitted (e.g., by the UE) and received (e.g., by the base station). This amount of delay is due to the propagation speed of electromagnetic radiation. Typically, this mount of delay is relatively small because UE tends to be within a relatively short distance of the base station. For instance, a range of less than one kilometer to ten kilometers between the UE and base station may be common. However, circumstances exist where this distance may be significantly greater.

SUMMARY

Various embodiments are described related to using an estimated timing advance for user equipment communications. In some embodiments, a method for using an estimated timing advance for user equipment communications is described. The method may include determining, by user equipment, a location of the user equipment using a global navigation satellite system. The method may include calculating, by the user equipment, a first estimated distance between the user equipment and a communication satellite using the determined location of the user equipment and an estimated satellite location. The estimated satellite location may indicate an estimated orbital location of the communication satellite. The method may include determining, by the user equipment, a second estimated distance between the communication satellite and a communication network gateway. Communications between the user equipment and a communication network may be routed through the communication network gateway and communication satellite. The method may include calculating, by the user equipment, an estimated timing offset using the calculated first estimated distance and the determined second estimated distance. The method may include transmitting, by the user equipment, to the communication satellite, an uplink data frame such that a timing of transmission of the uplink data frame may be based on the calculated estimated timing offset.

Embodiments of such a method may include one or more of the following features: The uplink data frame transmitted to the communication satellite may include a physical random access channel (PRACH) preamble. The method may include determining, by the communication network gateway, an amount of timing error due to the first estimated distance and the second estimated distance being estimated. The method may include determining, by the communication network gateway, a timing advance (TA) value based on the amount of timing error. The method may include transmitting, by the communication network gateway, a timing advance command that comprises the TA value to the user equipment via the communication satellite. The method may include receiving, by the user equipment, the TA command that comprises the TA value to the user equipment via the communication satellite. The method may include using, by the user equipment, the estimated timing advance and the received TA value to create a corrected TA value. The method may include transmitting, by the user equipment, to the communication satellite, data such that a timing of transmission of the data may be based on the corrected TA value. The TA value may be twelve bits in length. The TA value may have a defined maximum value of 3846. The TA value may allow for a timing correction of less than 2.5 ms. The communication satellite may be in geosynchronous orbit of the earth. A maximum amount of error of a total distance may be 100 km. The total distance may be the calculated first estimated distance summed with the determined second estimated distance. Determining the second estimated distance between the communication satellite and the communication network gateway may include accessing the second estimated distance from a local data storage arrangement. Determining the second estimated distance between the communication satellite and the communication network gateway may include receiving a system information broadcast message that indicates the second estimated distance. The method may further include accessing locally-stored orbital information of the communication satellite. The communication satellite may be in low earth orbit (LEO) or middle earth orbit (MEO). The method may include calculating the estimated satellite location based on the locally-stored orbital information. The communication network gateway may include a gNodeB.

In some embodiments, a device for using an estimated timing advance for satellite-based communications is described. The device may include a satellite antenna for communicating directly with a communication satellite that relays communications to a satellite gateway system. The device may include a global navigation satellite system (GNSS) component. The device may include one or more processors in communication with the satellite antenna and the GNSS component. The one or more processors may be configured to determine a location of the device using the GNSS component. The one or more processors may be configured to calculate a first estimated distance between the device and a communication satellite using the determined location of the device and an estimated satellite location. The estimated satellite location may indicate an estimated orbital location of the communication satellite. The one or more processors may determine a second estimated distance between the communication satellite and a communication network gateway. Communications between the device and a communication network may be routed through the communication network gateway and communication satellite. The one or more processors may calculate an estimated timing offset using the calculated first estimated distance and the determined second estimated distance. The one or more processors may transmit, to the communication satellite, via the satellite antenna, an uplink data frame such that a timing of transmission of the uplink data frame may be based on the calculated estimated timing offset.

Embodiments of such a method may include one or more of the following features: The uplink data frame transmitted to the communication satellite may include a physical random access channel (PRACH) preamble. The one or more processors may be further configured to receive a timing advance (TA) command that comprises a TA value transmitted to the device via the communication satellite. The one or more processors may be further configured to use the estimated timing advance and the received TA value to create a corrected TA value. The one or more processors may be further configured to transmit to the communication satellite, via the satellite antenna, data such that a timing of transmission of the data may be based on the corrected TA value.

In some embodiments, a system for using an estimated timing advance for satellite-based communications. The system may include a communication satellite. The system may include a communication network gateway system that communicates with the communication satellite. The system may include user equipment, comprising a satellite antenna for communicating with the communication satellite that may relay communications to a satellite gateway system. The user equipment may include a global navigation satellite system (GNSS) component. The user equipment may include one or more processors in communication with the satellite antenna and the GNSS component. The one or more processors may be configured to determine a location of the user equipment using the GNSS component. The one or more processors may be configured to calculate a first estimated distance between the user equipment and a communication satellite using the determined location of the user equipment and an estimated satellite location. The estimated satellite location may indicate an estimated orbital location of the communication satellite. The one or more processors may be configured to determine a second estimated distance between the communication satellite and the communication network gateway system. Communications between the user equipment and a communication network may be routed through the communication network gateway system and communication satellite. The one or more processors may be configured to calculate an estimated timing offset using the calculated first estimated distance and the determined second estimated distance. The one or more processors may be configured to transmit, to the communication satellite, via the satellite antenna, an uplink data frame such that a timing of transmission of the uplink data frame may be based on the calculated estimated timing offset.

Embodiments of such a method may include one or more of the following features: The communication network gateway system may be configured to determine an amount of timing error due to the first estimated distance and the second estimated distance being estimated. The system may be configured to determine a timing advance (TA) value based on the amount of timing error. The system may be configured to transmit a timing advance command that comprises the TA value to the user equipment via the communication satellite. The user equipment may be further configured to receive the TA command that comprises the TA value to the user equipment via the communication satellite. The system may be configured to use the estimated timing advance and the received TA value to create a corrected TA value. The system may be configured to transmit, to the communication satellite, data such that a timing of transmission of the data may be based on the corrected TA value. The communication satellite may be in geosynchronous orbit of the earth and a maximum amount of error of a total distance may be 100 km. The total distance may be the calculated first estimated distance summed with the determined second estimated distance.

DETAILED DESCRIPTION

In certain circumstances, the distance between UE and a base station (e.g., a gNodeB, an eNodeB) may be significantly greater than the previous example of less than one to a hundred kilometers. If UE communicates with, for example, a gNodeB via a communication satellite, the distance between the UE and the base station can be significantly greater. If the communication satellite is located in geosynchronous orbit, the communication satellite may be in orbit of the earth at an altitude of approximately 35,786 kilometers. Due to signal propagation between the UE and the communication satellite, the communication satellite and a satellite gateway, and the satellite gateway and a communication network gateway, such as a base station (e.g., eNodeB), a signal from UE being transmitted to the communication network gateway may travel over 71,572 kilometers. This distance can result in a signal taking at least 540 milliseconds to travel between the UE and the communication network gateway.

A timing advance (TA) can be a negative timing offset that is used by UE to determine when uplink data (e.g., an uplink subframe) should be transmitted by the UE in relation to downlink data (e.g., the downlink subframe) received by the UE. By using the TA and offsetting transmission of the uplink data before the downlink data is received, the TA can allow for the uplink data (e.g., uplink subframe) to be synchronized with the downlink data at the communication network gateway, such as the eNodeB or gNodeB. Equation 1 defines how the TA is used to determine when an uplink frame should be transmitted in relation to the downlink frame:

$$T_{TA} = N_{TA} T_S \qquad \text{Eq. 1}$$

Figure 1:
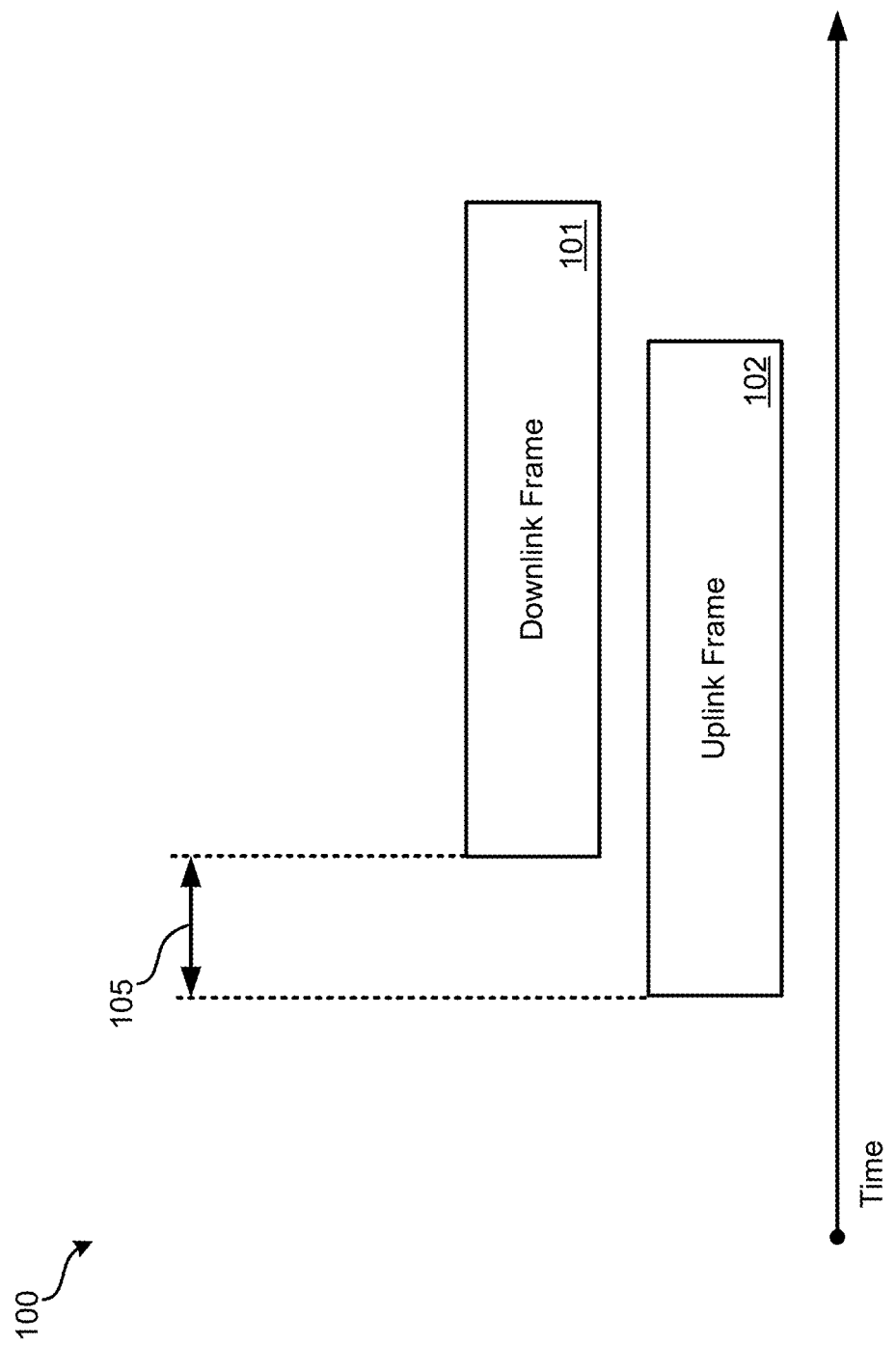
FIG. 1 illustrates a diagram representing the timing relationship of a received downlink frame and a transmitted uplink frame.

In Equation 1, $T_S$ represents the sampling time, which can depend on the subcarrier spacing (SCS). $T_{TA}$ represents the timing advance. $N_{TA}$ is a command that is transmitted by the communication gateway to the UE in the form of a timing advance command that is used by the UE to determine $T_{TA}$. FIG. 1 illustrates a diagram 100 representing the timing relationship at the UE of a received downlink frame 101 and a transmitted uplink frame 102. The uplink frame is transmitted $N_{TA} T_S$, represented by time period 105, ahead of the downlink frame being received such that at the communication network gateway, the downlink frame and uplink frame are temporally synchronized.

The size of the timing advance command field ($N_{TA}$) may have a defined length. For instance, under the proposed Fifth Generation Wireless Systems (5G), the timing advance command field may be limited to twelve bits. While twelve bits allows for a decimal value of 4095, the maximum value for the timing advance command field may be limited to 3846. Further, when a large timing advance is used, a guard-time (GT) used as part of the random access channel (RACH) preamble needs to be long in duration to account for the communication delay.

Therefore, the greater the distance between the UE and the communication network gateway, the greater the value of the timing advance command may need to be such that the uplink subframe and the downlink subframe are synchronized at the communication network gateway. However, without modification, in a scenario where frames are transmitted through either a geosynchronous communication satellite or a satellite in low earth orbit (LEO) or medium earth orbit (MEO), a twelve bit value for the timing advance command field may be insufficient such that a great enough timing advance is used by the UE such that the uplink frame and downlink frame are synchronized by the communication network gateway.

Embodiments detailed herein allow for a UE to apply a sufficient timing offset such that downlink and uplink frames are approximately synchronized at the communication network gateway and allowing for the communication network gateway to perform a further, smaller adjustment using a timing advance value. Further, embodiments detailed herein allow for the GT to be kept low despite the large distance between the UE, communication satellite, satellite gateway, and communication network gateway. In embodiments detailed herein, an estimate of the distances between the UE, communication satellite, satellite gateway, and communication network gateway can be determined since the satellite remains roughly in the same location (or travels according to a predictable orbit for LEO and MEO satellites). This estimate may be used for determining an initial estimated timing offset, which then may be adjusted by the communication network gateway based on an actual observed data transmission time.

By using such an estimated timing offset, the performance of the communication system may be significantly improved. For instance, additional data does not need to be transmitted since the TA value may be kept at twelve bits or smaller; a long guard time does not need to be introduced to account for the time delay between the UE and communication network gateway, allowing the network resources to be more efficiently used.

Figure 2:
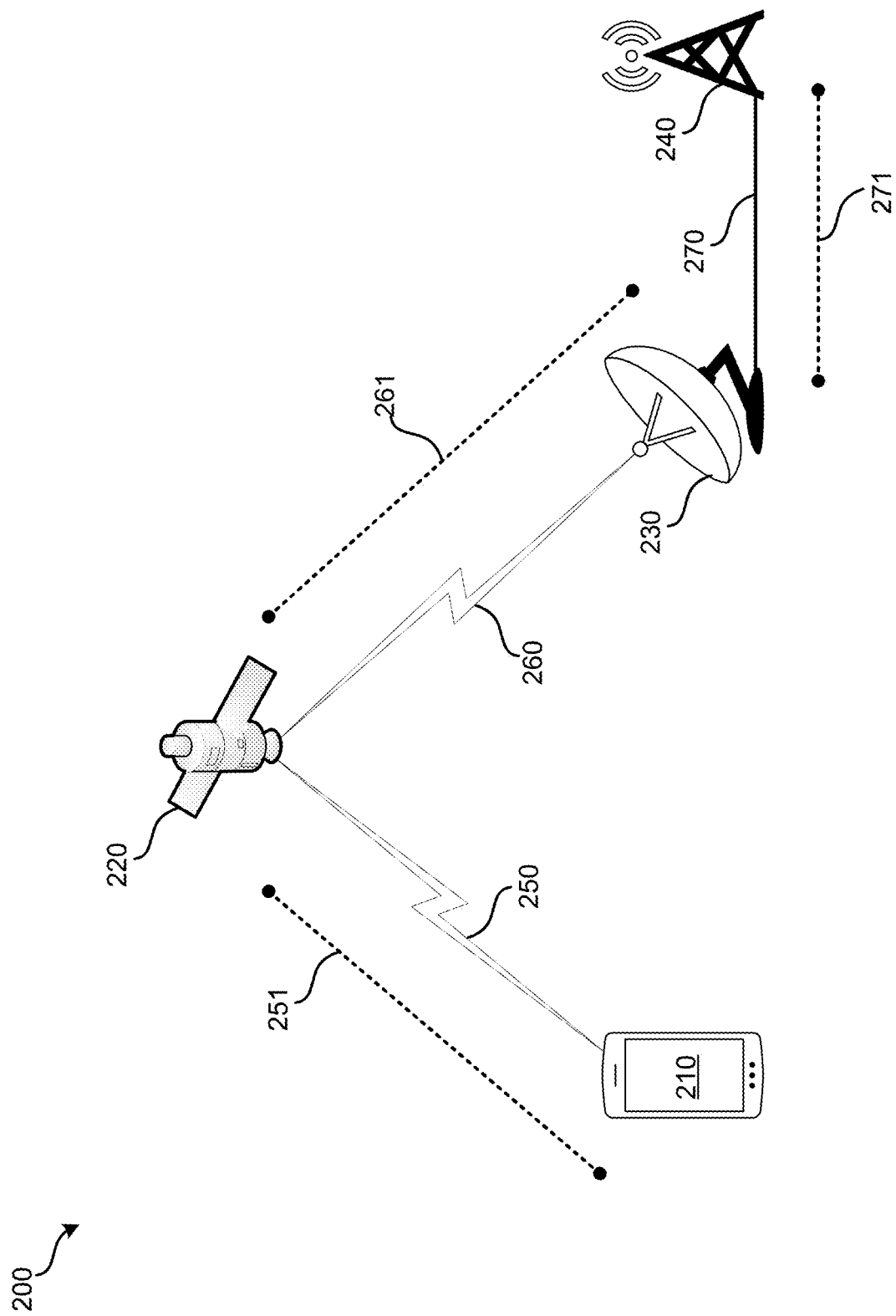
FIG. 2 illustrates an embodiment of a satellite-based communication network.

FIG. 2 illustrates an embodiment of a satellite-based communication system 200. Satellite-based communication system 200 may comprise: UE 210, communication satellite 220, satellite gateway system 230, and communication network gateway 240. UE 210 may represent various computerized devices that can be used for communication purposes, such as: a satellite phone; a satellite smartphone; a satellite modem; or some other form of communication device enabled to communicate directly with a GEO, LEO, or MEO satellite.

Communication satellite 220 may function as a relay between UE 210 and satellite gateway system 230. Communication satellite 220 may receive a signal from satellite gateway system 230 and transmit to UE 210 on a different frequency, referred to as a downlink transmission. Communication satellite 220 may receive a signal from UE 210 and transmit to satellite gateway system 230 on a different frequency, referred to as a downlink transmission. Satellite gateway system 230 may serve to transmit and receive messages with communication satellite 220. Satellite gateway system 230 may receive messages for transmission to UE 210 from communication network gateway 240 and transmit such messages via communication satellite 220 to UE 210. Satellite gateway system 230 may receive messages from communication satellite 220 that are from UE 210 and translate and transmit such messages to communication network gateway 240.

Communication network gateway 240 may serve as a link between satellite gateway system 230 and one or more other networks, such as the Internet, a 4G or 5G wireless communication network, or some other form of communication network. In some embodiments, satellite gateway system 230 and communication network gateway 240 are collocated and/or are combined into a single gateway system (i.e., a gateway system that converts directly between satellite communications and the desired communication network). In other embodiments, communication network gateway 240 is located a distance from satellite gateway system 230 and either wireless or wired (e.g., fiber-optic based) communication is used between satellite gateway system 230 and communication network gateway 240. In some embodiments, communication network gateway 240 comprises an eNodeB (Evolved Node B or eNB) or gNodeB (Next generation Node B or gNB). Communication network gateway 240 may be part of a 4G, 5G, or some other generation of wireless communication network.

For a transmission from UE 210 to communication network gateway 240, uplink data may be transmitted via wireless communication path 250, wireless communication path 260, and, if communication network gateway 240 is located a distance from satellite gateway system 230, communication path 270. Therefore, uplink data transmitted by UE 210 has three distances to traverse: distance 251, distance 261, and distance 271 (if communication network gateway 240 is located a distance from satellite gateway system 230).

Despite these distances being large, the distances may be estimated with a relatively high degree of accuracy by UE 210 if the UE is provided with certain pieces of data. For instances where communication satellite 220 is in geosynchronous orbit, communication satellite 220 remains within an orbit slot or window approximately above fixed position on the earth's equator. Relative the satellite's position above the earth, the window is relatively small: a geosynchronous satellite may be about 35,786 km above the earth's surface. The window may be approximately 50 kilometers in each direction from the satellite's defined orbital position. Additionally, UE 210 may be able to determine its own location on earth, such as using a global navigation satellite system (GNSS). For instance, a global positioning system (GPS) module may be on-board UE 210 that allows the UE to determine its own location with a high degree of accuracy. Since UE 210 can determine its own location and can store data indicating the orbital position of communication satellite 220 (which may not account of drift of communication satellite 220 within the window around its orbital position), distance 251 can be estimated.

Since satellite gateway system 230 is located in a fixed position and communication satellite 220 is in a geosynchronous orbit, distance 261 can be determined once and provided to UE 210. UE 210, satellite gateway system 230, or communication network gateway 240 may perform the calculation of distance 261 and, if necessary, provide an indication of the distance to UE 210. If satellite gateway system 230 is not collocated with communication network gateway 240, distance 271 may also be needed to estimate the delay caused by electromagnetic propagation between satellite gateway system 230 and communication network gateway 240. If wireless communication is used, distance 271 may be a straight line between satellite gateway system 230 and communication network gateway 240. If a wired communication arrangement is used, the distance may be the distance of the wire, which may be in a straight line between satellite gateway system 230 and communication network gateway 240. Regardless of wired or wireless, distance 271 may be fixed and may be determined with a high degree of accuracy. An indication of this distance may be provided to UE 210 or may be added to distance 261 such that a single distance measurement can be provided to UE 210.

Since UE 210 may be able to determine its location precisely, the possibly unknown variable is movement of communication satellite 220 within its orbital window. This variation, however, is small compared to the overall distances 251, 261, and 271 and may be accounted for using a TA value.

Figure 3:
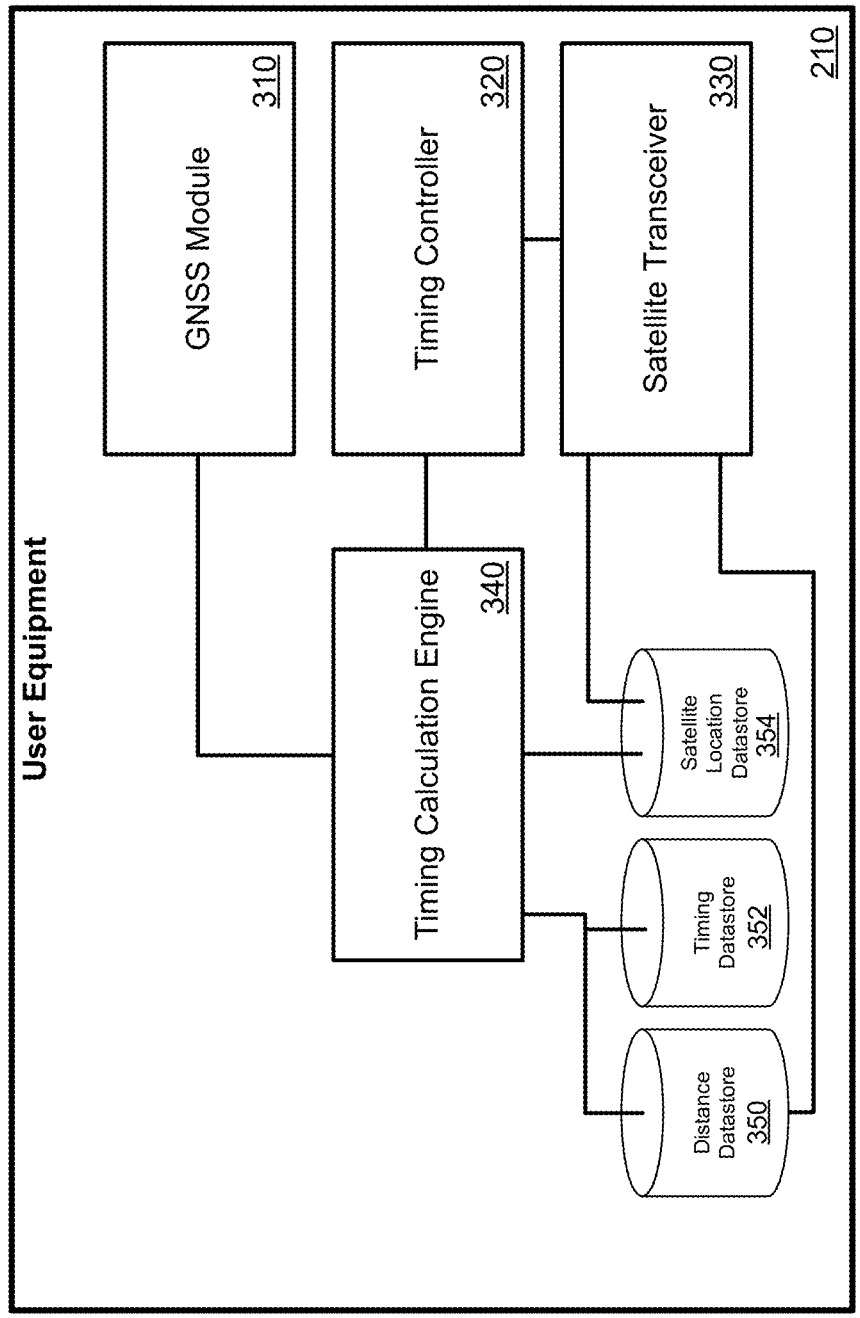
FIG. 3 illustrates a block diagram of an embodiment of user equipment (UE).

UE 210 may include various other computerized components that are omitted from FIG. 3 for simplicity. One or more processors; one or more processor-readable storage arrangements; one or more data buses; one or more wired and/or wireless interfaces; and/or one or more user interfaces may be present in various embodiments of UE 210.

FIG. 3 illustrates a block diagram of an embodiment of UE 210. UE 210 may include GNSS module 310, timing controller 320, satellite transceiver 330, timing calculation engine 340, distance datastore 350, timing datastore 352, and satellite location datastore 354. GNSS module 310 may use one or more of various available global navigation satellite systems (e.g., GPS, GLONASS, Galileo, Beidou) to determine a location of UE 210. GNSS module 310 may periodically provide an indication of location of UE 210 to timing calculation engine 340.

Timing controller 320 may control when an uplink data frame is transmitted by satellite transceiver 330. Timing controller 320 may receive an indication of an estimated timing offset that is to be applied to uplink frames from timing calculation engine 340. Timing controller 320 may implemented in software, firmware, or hardware. For instance, timing controller 320 may be implemented using one or more specialized or general-purpose processors, possibly in combination with timing calculation engine 340.

Satellite transceiver 330 may transmit and receive data with communication satellite 220. When uplink data is transmitted by satellite transceiver 330 may be based on timing information provided by timing controller 320.

Timing calculation engine 340 may access stored data from distance datastore 350, timing datastore 352, and/or satellite location datastore 354 in order to determine when uplink data is to be transmitted in relation to downlink data by satellite transceiver 330. Timing calculation engine may perform blocks as detailed in relation to method 500 of FIG. 5 in order to determine an amount of estimated timing advance. Timing calculation engine 340 may implemented in software, firmware, or hardware. Timing calculation engine 340 may be implemented using one or more specialized or general-purpose processors.

Distance datastore 350 may be used to store indications of distance 261 and, if present, distance 271. In some embodiments, distance 261 and distance 271 are combined into a single distance value. Distances 261 and 271 (or the combined distance) may be provided to UE 210 as part of broadcast transmission by satellite gateway system 230. In some embodiments, distances 261 and 271 (or the combined distance) may be provided to UE 210 via another communication path, such as via another wireless or wired network with which UE 210 is currently or previously connected. Since distances 261 and 271 do not change much or frequently, UE 210 may store distances 261 and 271 (or the combined distance) and these distances may remain valid for long periods of time. Therefore, it may be possible that UE 210 receive distances 261 and 271 (or the combined distance) as part of a software update or at the time of manufacture. UE 210 may store distance indications for multiple satellite gateway systems 230 and may be able to determine, such as based on location or received data, with which satellite gateway system that UE 210 is communicating. Similarly, distance datastore 350 may store distances for multiple combinations of the satellite gateway systems and communication network gateways. For instance, if a particular communication network gateway goes offline, another communication network gateway may be used, which would result in a different distance 271. In some embodiments, distance 251 may be stored in distance datastore 350. Alternatively, since distance 251 is calculated by timing calculation engine 340 based on location data from GNSS module 310, distance 251 may be calculated when needed and not stored to distance datastore 350.

In some embodiments, in addition or in alternate to storing distances in distance datastore 350, timing values may be stored in timing datastore 352. That is, rather than (or in addition to) storing indications of distances 251, 261, and 271, values that indicate an estimated amount timing offset may be stored.

Satellite location datastore 354 may store the estimated orbital location of communication satellite 220 if it is a geosynchronous satellite. The precise location of communication satellite 220 may vary about 50 kilometers in any direction from the orbital location, thus the stored location of communication satellite 220 may be only an estimate. If communication satellite 220 is in LEO or MEO orbit, rather than satellite location datastore 354 storing a defined location, satellite location datastore 354 may store data representative of an orbit of communication satellite 220 such that timing calculation engine 340 can calculate a current location of communication satellite 220.

Figure 4:
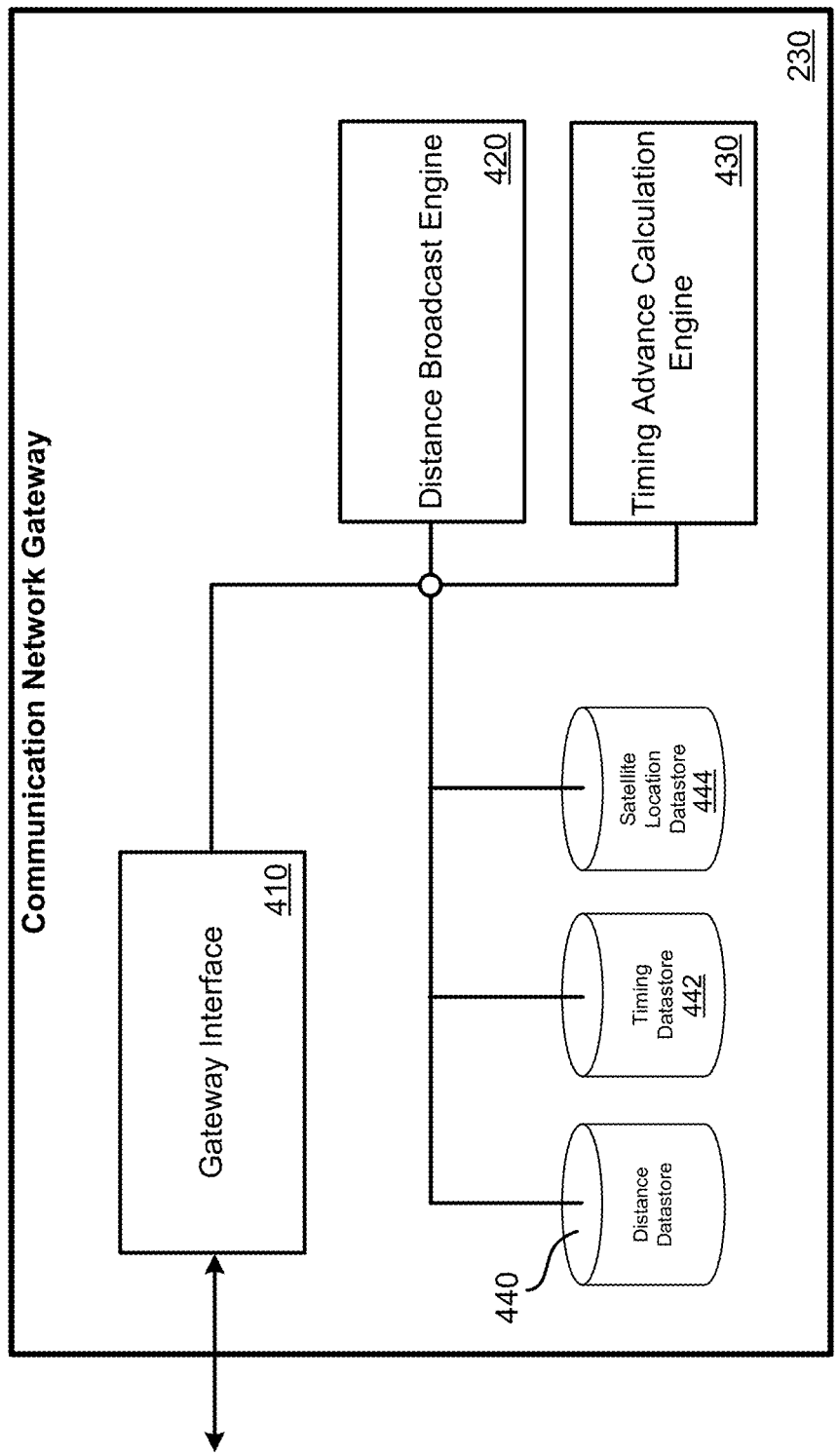
FIG. 4 illustrates a block diagram of an embodiment of a communication network gateway.

Communication network gateway 240 may include various other computerized components that are omitted from FIG. 4 for simplicity. One or more processors; one or more processor-readable storage arrangements; one or more data buses; one or more wired and/or wireless interfaces; and/or one or more user interfaces may be present in various embodiments of communication network gateway 240.

FIG. 4 illustrates a block diagram of an embodiment of communication network gateway 240. While an estimated timing offset may be determined and used by the UE initially, the communication network gateway, such as during a RACH process, may determine a timing advance value to correct the detected timing difference between a downlink frame being sent to the UE and an uplink frame received from the UE. Therefore, the TA value determined by communication network gateway 240 may be used to adjust the estimated timing offset being used by UE 210.

Communication network gateway 240, which may be or include a gNodeB, may include gateway interface 410. Gateway interface 410 may allow communication network gateway 240 to communicate with satellite gateway system 230. Gateway interface 410 may be bidirectional and allow data to be transmitted to and received from satellite gateway system 230.

Distance broadcast engine 420 may occasionally or periodically be used to transmit location, distance, and/or timing data to multiple UEs. For instance, distance broadcast engine 420 may broadcast the location of communication satellite 220 (for a GEO satellite); information to calculate a location of communication satellite 220 (for a MEO or LEO satellite); distance or timing information relating to distance 261 (for one or more satellite gateway systems); distance or timing information relating to distance 271 (for one or more combinations of satellite gateway systems and communication network gateways).

Timing advance calculation engine 430 may calculate a timing advance (TA) value based on an uplink data frame received from UE 210. This uplink data frame already was transmitted in advance based on the estimated timing offset calculated by the UE. However, the estimated timing offset does not take into account the exact location of communication satellite 220. Therefore, it is expected that at least some amount of timing advance adjustment may be needed. Since the vast majority of the needed TA is captured in the estimated timing offset determined by the UE, the TA value calculated by TA calculation engine 430 may be comparatively small (and may be captured within twelve bits). The value calculated by TA calculation engine 430 can refer to $N_{TA}$ of Equation 1. The UE, when the value is received, can further adjust the timing advance such that $N_{TA}$ is used to further adjust the estimated timing offset. Timing advance calculation engine 430 may implemented in software, firmware, or hardware. For instance, timing advance calculation engine 430 may be implemented using one or more specialized or general-purpose processors.

Distance datastore 440 may be used to store indications of the distances between communication satellite 220, one or more satellite gateway systems, and the communication network gateway. These distances may be updated relatively infrequently and may be used by distance broadcast engine 420 to occasionally or periodically provide distance data to instances of UE for use in calculated the estimated timing offset value. In some embodiments, in addition or in alternate to storing distances in distance datastore 440, timing values may be stored in timing datastore 442. That is, rather than (or in addition to) storing indications of distances 261 and 271, values that indicate a corresponding estimated amount timing offset may be stored. In some embodiments, distance broadcast engine 420 may transmit such timing data in addition to or instead of distance data.

Satellite location datastore 444 may store indications of an orbit position of a geosynchronous satellite or may store information to calculate an orbit of a LEO or MEO satellite. Such data may be transmitted periodically or occasionally to instances of UE by distance broadcast engine 420.

Figure 5:
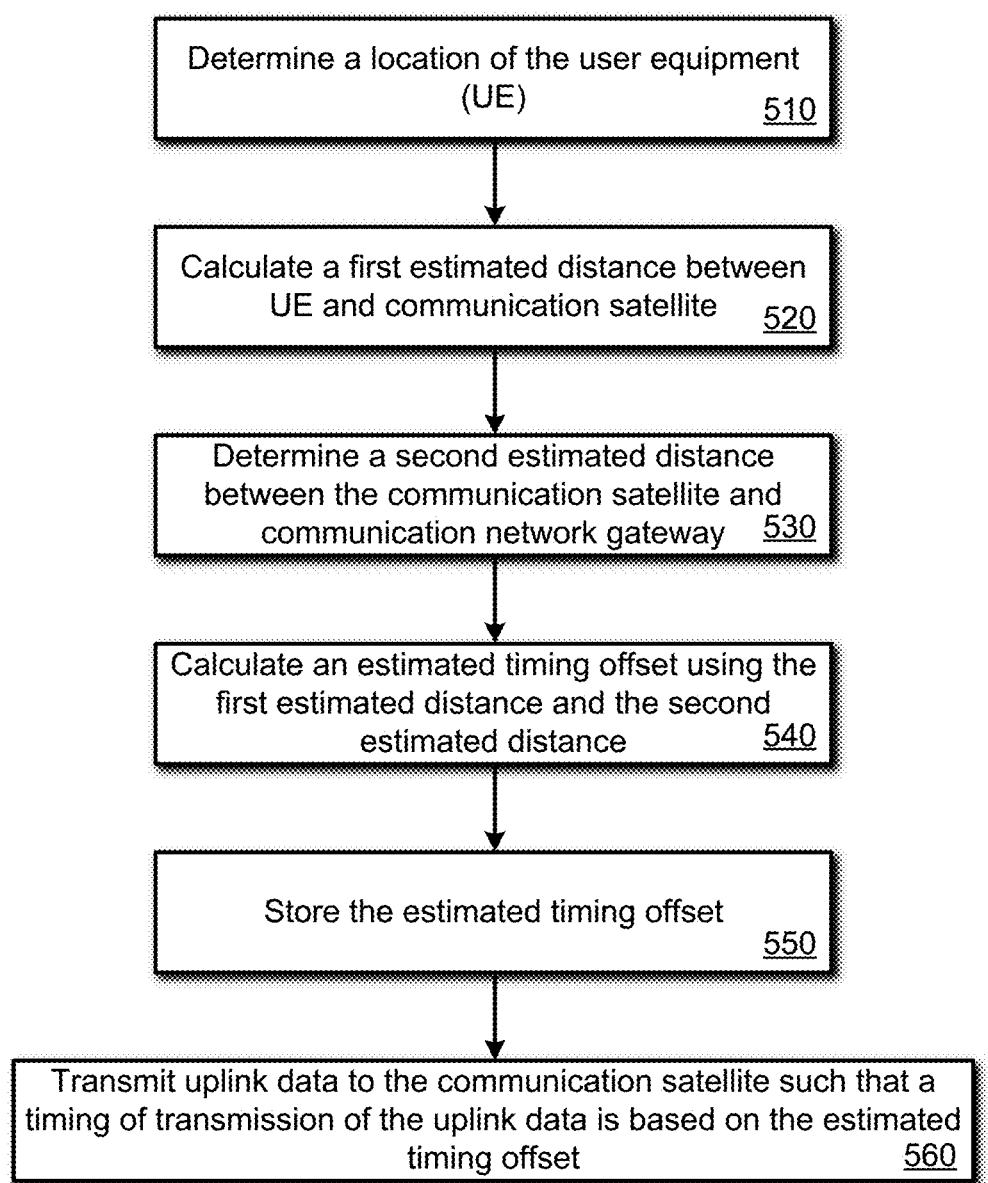
FIG. 5 illustrates an embodiment of a method for determining and using an estimated timing offset for user equipment communications.

Various methods may be performed using the systems and devices detailed in relation to FIGS. 1-4. FIG. 5 illustrates an embodiment of a method 500 for determining and using an estimated timing offset for user equipment communications. Each step of method 500 may be performed using user equipment, such as UE 210. At block 510, a location of the UE may be determined. The UE may use an on-board GNSS (e.g., GPS) component to determine its location. Other forms of location determination may also be possible. For instance, the UE may be able to determine its location based on user input, sensing one or more particular wireless networks (e.g., a Wi-Fi network), dead reckoning, etc.

At block 520, a first estimated distance between the UE and the communication satellite may be calculated. Block 520 may involve the UE accessing data that indicates an estimated location of the satellite. In some embodiments, such as if the satellite is in LEO or MEO, the UE may store an indication of an orbit of the communication satellite such that by accessing a current date and time, the UE can determine the approximate location of the communication satellite.

At block 520, a second estimated distance between the communication and the communication network gateway may be determined. This second estimated distance may include a single value that indicates that includes the distance between a satellite gateway system and the communication satellite and the distance between the satellite gateway system and the communication network gateway. In other embodiments, these two distances may be stored distinctly and may be summed. In some embodiments, rather than accessing a stored distance, the distances may be calculated by the UE based on location information of the satellite, satellite gateway system, and communication network gateway stored by the UE or otherwise accessible by the UE. When the communication satellite is in geosynchronous orbit, the satellite is expected to remain within an orbital slot that varies by about 50 kilometers from a center position of the orbital slot. As such, the maximum estimated distance error for the combination of the first estimated distance and second estimated distance is about 100 kilometers.

At block 540, a timing offset may be calculated using the first estimated distance from block 520 and the second estimated distance from block 530. The timing offset may be calculated based on the total distance being divided by the speed of electromagnetic radiation (the speed of light). Based on the maximum estimated distance error, a maximum timing error of the offset is expected to be, at most, 0.67 milliseconds.

At block 550, the estimated timing offset may be stored by the UE. At block 560, the estimated timing offset may be used to determine an amount of time ahead of a downlink frame that an uplink frame of data should be transmitted to the communication satellite such that the network communication gateway receives the uplink data approximately in synchronization with the downlink frame it is transmitting to the UE. The estimated timing offset may be used to offset the transmission of uplink data until a TA value is received from the communication network gateway, such as part of the RACH process. The maximum expected amount of error that will be corrected using the TA value is 0.67 milliseconds. At block 560, the uplink data transmitted may include a physical random access channel preamble (PRACH).

Figure 6:
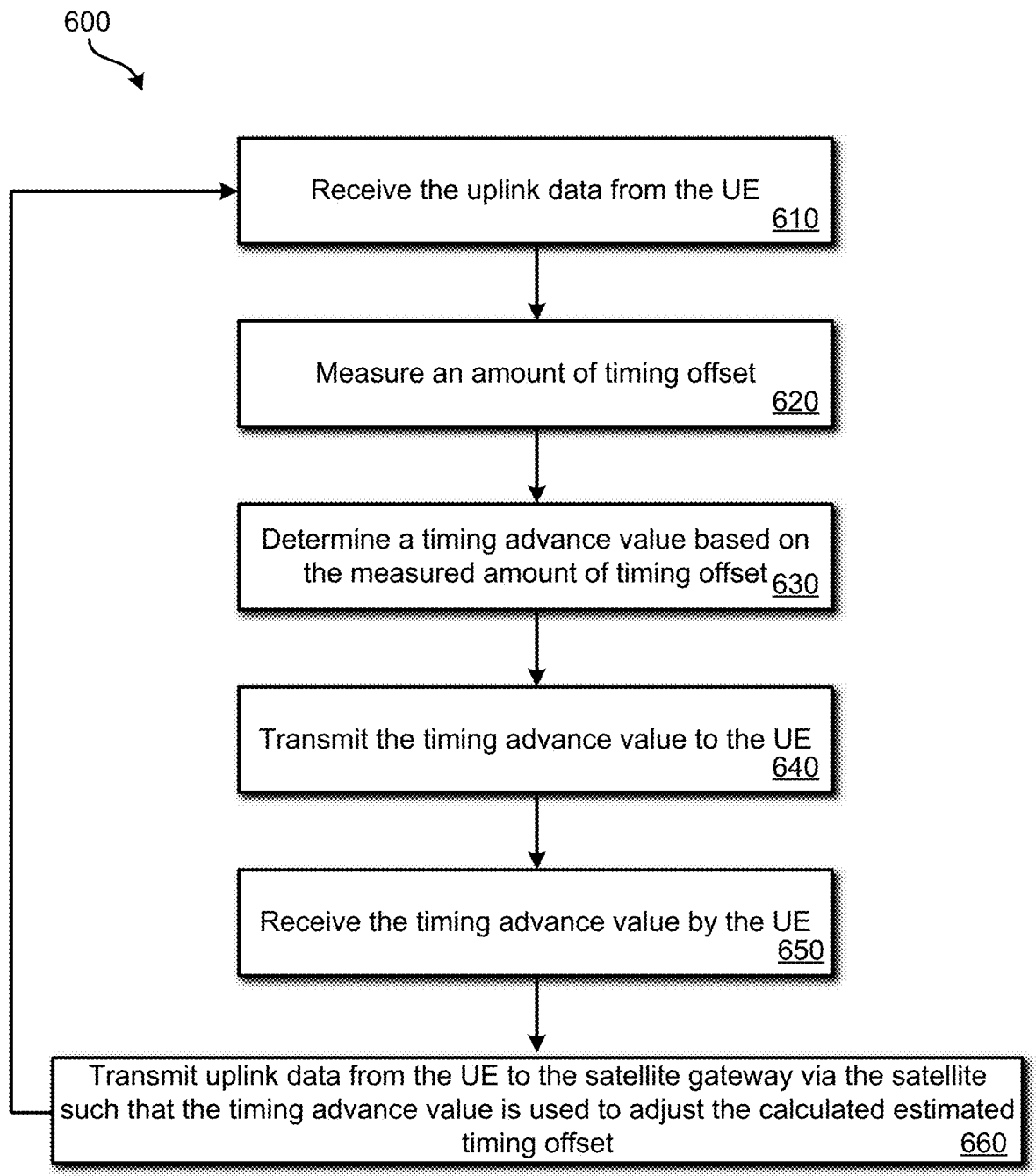
FIG. 6 illustrates an embodiment of a method for creating and using a timing advance (TA) command.

FIG. 6 illustrates an embodiment of a method 600 for creating and using a timing advance (TA) command to correct any timing error present in the estimated timing offset used as part of method 500. Method 600 may be performed following method 500. Method 600 may be performed as part of a RACH process. Each step of method 600 may be performed using a communication network gateway, such as communication network gateway 240. In some embodiments, blocks of method 600 may be performed using a satellite gateway system, such as if a communication network gateway is incorporated as part of the satellite gateway system.

At block 610, uplink data, such as in the form of an uplink frame, may be received by the communication network gateway from the UE, via the communication satellite and the satellite gateway system. At block 620, an amount of timing offset between the uplink frame and the time at which the communication network gateway transmits a corresponding downlink frame may be determined. At block 620, it can be expected that the amount of timing offset between the uplink frame in the downlink frame will be significantly smaller in duration than the propagation delay due to the distance between the user equipment, communication satellite, satellite gateway system, and communication network gateway because the user equipment has already applied a timing offset such that the uplink data frame was transmitted early.

At block 630, based on the measured amount of timing offset of block 620, a timing advance value may be determined. Based in the offset measured at block 620, the TA value may be determined. This TA value may be 12 or fewer bits and may have a maximum value of 3846. The TA value determined at block 630 may be based on Equation 1. Therefore, the timing advance value determined at block 630 can be used by the UE to compute an amount of time to use as the TA. At block 640, the timing advance value may be transmitted to the UE and the timing advance value may be received by the UE at block 650. The TA value transmitted at block 640 may be part of a random access response (RAR). The timing advance value may be transmitted as part of a timing advance command field that has a defined number of bits, such as twelve.

At block 660, future uplink data transmitted by the UE to the satellite gateway system via the satellite may have its timing modified such that the received TA value is used to adjust the estimated timing offset value calculated as part of method 500. Therefore, the estimated timing offset value is still used in transmitting data by the UE, but is further adjusted based on the received TA value. The UE may continue to receive adjusted TA values over time, which may be repeatedly used to adjust the estimated timing offset value calculated as part of method 500.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for using an estimated timing advance for user equipment communications, the method comprising:
   determining, by user equipment, a location of the user equipment using a global navigation satellite system;
   calculating, by the user equipment, a first estimated distance between the user equipment and a communication satellite using the determined location of the user equipment and an estimated satellite location, wherein the estimated satellite location indicates an estimated orbital location of the communication satellite;
   determining, by the user equipment, a second estimated distance between the communication satellite and a communication network gateway, wherein communications between the user equipment and a communication network are to be routed through the communication network gateway and the communication satellite;
   calculating, by the user equipment, an estimated timing offset using the calculated first estimated distance and the determined second estimated distance;
   transmitting, by the user equipment, to the communication satellite, an uplink data frame such that a timing of transmission of the uplink data frame is based on the calculated estimated timing offset;
   receiving, by the user equipment, a TA command that comprises a timing advance (TA) value to the user equipment transmitting by the communication network gateway via the communication satellite;
   adjusting, by the user equipment, the calculated estimated timing offset based on the received TA value to create a corrected TA value; and
   transmitting, by the user equipment, to the communication satellite, data such that a timing of transmission of the data is based on the corrected TA value.

2. The method for using the estimated timing advance for the user equipment communications of claim 1, wherein the uplink data frame transmitted to the communication satellite comprises a physical random access channel (PRACH) preamble.

3. The method for using the estimated timing advance for the user equipment communications of claim 2, further comprising:
   determining, by the communication network gateway, an amount of timing error due to the first estimated distance and the second estimated distance being estimated;
   determining, by the communication network gateway, the timing advance (TA) value based on the amount of timing error; and
   transmitting, by the communication network gateway, a timing advance command that comprises the TA value to the user equipment via the communication satellite.

4. The method for using the estimated timing advance for the user equipment communications of claim 3, wherein the TA value is twelve bits in length.

5. The method for using the estimated timing advance for the user equipment communications of claim 4, wherein the TA value has a defined maximum value of 3846.

6. The method for using the estimated timing advance for the user equipment communications of claim 3, wherein the TA value allows for a timing correction of less than 2.5 ms.

7. The method for using the estimated timing advance for the user equipment communications of claim 1, wherein the communication satellite is in geosynchronous orbit of the earth.

8. The method for using the estimated timing advance for the user equipment communications of claim 7, wherein a maximum amount of error of a total distance is 100 km, wherein the total distance is the calculated first estimated distance summed with the determined second estimated distance.

9. The method for using the estimated timing advance for the user equipment communications of claim 1, wherein determining the second estimated distance between the communication satellite and the communication network gateway comprises accessing the second estimated distance from a local data storage arrangement.

10. The method for using the estimated timing advance for the user equipment communications of claim 9, wherein determining the second estimated distance between the communication satellite and the communication network gateway comprises receiving a system information broadcast message that indicates the second estimated distance.

11. The method for using the estimated timing advance for the user equipment communications of claim 1, further comprising:
accessing locally-stored orbital information of the communication satellite, wherein the communication satellite is in low earth orbit (LEO) or middle earth orbit (MEO); and
calculating the estimated satellite location based on the locally-stored orbital information.

12. The method for using the estimated timing advance for the user equipment communications of claim 1, wherein the communication network gateway comprises a gNodeB.

13. A device for using an estimated timing advance for satellite-based communications, the device comprising:
a satellite antenna for communicating directly with a communication satellite that relays communications to a satellite gateway system;
a global navigation satellite system (GNSS) component; and
one or more processors in communication with the satellite antenna and the GNSS component, the one or more processors configured to:
determine a location of the device using the GNSS component;
calculate a first estimated distance between the device and the communication satellite using the determined location of the device and an estimated satellite location, wherein the estimated satellite location indicates an estimated orbital location of the communication satellite;
determine a second estimated distance between the communication satellite and a communication network gateway, wherein communications between the device and a communication network are to be routed through the communication network gateway and the communication satellite;
calculate an estimated timing offset using the calculated first estimated distance and the determined second estimated distance;
transmit, to the communication satellite, via the satellite antenna, an uplink data frame such that a timing of transmission of the uplink data frame is based on the calculated estimated timing offset;
receive a TA command that comprises a timing advance (TA) value transmitted by the communication network gateway via the communication satellite;
adjust the calculated estimated timing offset based on the received TA value to create a corrected TA value; and
transmit to the communication satellite, data such that a timing of transmission of the data is based on the corrected TA value.

14. The device for using the estimated timing advance for satellite-based communications of claim 13, wherein the uplink data frame transmitted to the communication satellite comprises a physical random access channel (PRACH) preamble.

15. A system for using an estimated timing advance for satellite-based communications, the system comprising:
a communication satellite;
a communication network gateway system that communicates with the communication satellite; and
user equipment, comprising:
a satellite antenna for communicating with the communication satellite that relays communications to the communication network gateway system;
a global navigation satellite system (GNSS) component; and
one or more processors in communication with the satellite antenna and the GNSS component, the one or more processors configured to:
determine a location of the user equipment using the GNSS component;
calculate a first estimated distance between the user equipment and the communication satellite using the determined location of the user equipment and an estimated satellite location, wherein the estimated satellite location indicates an estimated orbital location of the communication satellite;
determine a second estimated distance between the communication satellite and the communication network gateway system, wherein communications between the user equipment and a communication network are to be routed through the communication network gateway system and the communication satellite;
calculate an estimated timing offset using the calculated first estimated distance and the determined second estimated distance; and
transmit, to the communication satellite, via the satellite antenna, an uplink data frame such that a timing of transmission of the uplink data frame is based on the calculated estimated timing offset;
receive a TA command that comprises a timing advance (TA) value transmitted by the communication network gateway system via the communication satellite;
adjust the calculated estimated timing offset based on the received TA value to create a corrected TA value; and
transmit to the communication satellite, data such that a timing of transmission of the data is based on the corrected TA value.

16. The system of claim 15, wherein the communication network gateway system is configured to:
determine an amount of timing error due to the first estimated distance and the second estimated distance being estimated;

determine the timing advance (TA) value based on the amount of timing error; and transmit the TA command that comprises the TA value to the user equipment via the communication satellite.

17. The system of claim 16, wherein the communication satellite is in geosynchronous orbit of the earth and a maximum amount of error of a total distance is 100 km, wherein the total distance is the calculated first estimated distance summed with the determined second estimated distance.

* * * * *